United States Patent
Gomez Marmol et al.

(10) Patent No.: US 8,832,429 B2
(45) Date of Patent: Sep. 9, 2014

(54) SMART GRID AND METHOD FOR OPERATING A SMART GRID

(75) Inventors: Felix Gomez Marmol, Murcia (ES); Christoph Sorge, Heidelberg (DE); Osman Ugus, Hamburg (DE); Gregorio Martinez Perez, Mazarron Murcia (ES); Alban Hessler, Darmstadt (DE)

(73) Assignees: NEC Europe Ltd., Heidelberg (DE); Universidad de Murcia, Murcia (ES)

( * ) Notice: Subject to any disclaimer, the term of this patent is extended or adjusted under 35 U.S.C. 154(b) by 39 days.

(21) Appl. No.: 13/807,769

(22) PCT Filed: Jan. 31, 2011

(86) PCT No.: PCT/EP2011/000417
§ 371 (c)(1),
(2), (4) Date: Dec. 31, 2012

(87) PCT Pub. No.: WO2012/103896
PCT Pub. Date: Aug. 9, 2012

(65) Prior Publication Data
US 2013/0124850 A1  May 16, 2013

(51) Int. Cl.
*H04L 29/06* (2006.01)
*H04L 9/08* (2006.01)
*H04L 9/28* (2006.01)
*H04L 9/00* (2006.01)

(52) U.S. Cl.
CPC .............. *H04L 9/28* (2013.01); *H04L 2209/42* (2013.01); *H04L 9/0891* (2013.01); *H04L 63/0428* (2013.01); *Y04S 40/24* (2013.01); *H04L 63/065* (2013.01); *H04L 9/0833* (2013.01); *H04L 9/08* (2013.01); *H04L 9/008* (2013.01)

USPC ........... 713/153; 713/189; 380/270; 380/277; 380/278; 380/279; 380/280; 380/281; 380/284; 370/328; 370/338; 370/400

(58) Field of Classification Search
CPC ....... H04L 9/083; H04L 9/008; H04L 9/0891; H04L 9/0838; H04L 67/12; H04L 2463/061; H04L 2209/16; H04L 2209/805
USPC .......... 380/270, 277–281, 284; 713/153, 189; 370/328, 338, 400
See application file for complete search history.

(56) References Cited

U.S. PATENT DOCUMENTS

| | | | |
|---|---|---|---|
| 7,609,838 B2 | 10/2009 | Westhoff et al. | |
| 8,325,922 B1 * | 12/2012 | Sun et al. | 380/270 |
| 8,510,550 B2 | 8/2013 | Westhoff et al. | |

FOREIGN PATENT DOCUMENTS

| | | |
|---|---|---|
| JP | 2005295543 A | 10/2005 |
| JP | 2007018506 A | 1/2007 |
| JP | 2008109308 A | 5/2008 |
| WO | 2008/041052 | 4/2008 |
| WO | 2008/131787 | 11/2008 |
| WO | 2010098083 A1 | 9/2010 |

OTHER PUBLICATIONS

Vetter et al., "Homomorphic Primitives for a privacy-Friendly Smart Metering Architecture", pp. 1-10, Proceedings of the International Conference on Security and Cryptography (Secrypt) 2012.*
Oleshchuk et al., "Secure Multi-Party Computatins and Privacy Preservation: Results and Open Problems", pp. 20-26, ISSN 0085-7130 Telenor ASA 2007.*
Huang et al., "Secure encrypted-data aggregation for wireless sensor networks", pp. 1-13, Springer Science+Business Media 2009.*
Garcia et al., "Privacy-friendly Energy-meering via Homomorphic Encryption", pp. 1-14, STM'10 Procedings of the 6th internatonal conference on Security and Trust management.*
Li et al., "Secure Information Aggregation for Smart Grids Using Homomorphic Encryption", pp. 327-332, Smart Grid Communications (SmartGridComm), Oct. 2010 First IEEE International Conference.*
Castelluccia et al., "Efficient Aggregation of encrypted data in Wireless Sensor Networks", Proceedings of the Second Annual International Conference on Mobile and Ubiquitous Systems: Networking and Services (MobiQuitous 2005), IEEE, 2005, pp. 1-9, <URL:http://ieeexplore.ieee.org/xpls/abs_all.jsp?arnumber=1540992>.

Efthymiou et al., "Smart Grid Privacy via Anonymization of Smart Metering Data", Proceedings of the 2010 First IEEE International Conference on Smart Grid Communications (SmartGridComm), IEEE, 2010, pp. 238-243, <URL:http://ieeexplore.ieee.org/xpls/abs_all.jsp?arnumber=5622050>.

Li et al., "Secure Information Aggregation for Smart Grids Using Homomorphic Encryption", Proceedings of the 2010 First IEEE International Conference on Smart Grid Communications (SmartGridComm), IEEE, 2010, pp. 327-332, <URL:http://ieeexplore.ieee.org/xpls/abs_all.jsp?arnumber=5622064>.

International Search Report dated Feb. 7, 2012, corresponding to PCT/EP2011/000417.

Claude Castelluccia, et al.; "Efficient and Provable Secure Aggregation of Encrypted Data in Wireless Sensor Networks"; vol. 5, No. 3, May 1, 2009; pp. 1-36.

Melek A. Nen, et al.; "Secure Data Aggregation with Multiple Encryption"; Jan. 29, 2007; Wireless Sensor Networks; pp. 117-132.

\* cited by examiner

*Primary Examiner* — Hadi Armouche
*Assistant Examiner* — Hee Song
(74) *Attorney, Agent, or Firm* — Young & Thompson

(57) ABSTRACT

Method for operating a smart grid including a plurality of smart meters configured to monitor at least one physical measured quantity and to provide measurement results of the at least one physical measured quantity to a central entity, includes the following steps:

partitioning the smart grid into groups of smart meters, such that each of the smart meters belongs to exactly one group, all smart meters of one of the groups encrypt their measured value by applying a bihomomorphic encryption scheme and send it to the central entity, one smart meter per group is designated as key aggregator to which all smart meters of that group send their key employed for the encryption, the key aggregator computes the aggregation of all received keys and sends the aggregated key to the central entity, the central entity aggregates all received encrypted measured values and decrypts the aggregation by employing the aggregated key.

17 Claims, 3 Drawing Sheets

SMART GRID AND METHOD FOR OPERATING A SMART GRID

The present invention relates to a smart grid and a method for operating a smart grid including a plurality of smart meters, said smart meters being configured to monitor at least one physical measured quantity and to provide measurement results of said at least one physical measured quantity to a central entity.

Smart grids of the initially described type are gaining more and more importance. In particular in the field of electrical energy distribution, global electrical grids are verging on the largest technological transformation since the introduction of electricity into the home. The antiquated infrastructure that delivers power to our homes and businesses is being replaced with a collection of digital systems called the smart grid. This grid is the modernization of the existing electrical system that enhances customers' and utilities' ability to monitor, control, and predict energy use.

The usage-monitoring and -reporting device at each customer site is called the smart meter, which is a kind of "intelligent" counter. The smart meter is a computerized replacement of the electrical meter attached to the exterior of many of our homes today. Typically, a smart meter contains a processor, nonvolatile storage, and communication facilities. Although in many respects, the smart meter's look and function is the same as its unsophisticated predecessor, its additional features make it more useful. The additional features include, in particular, track usage as a function of time of day, disconnect a customer via software, or send out alarms in case of problems.

Figure 1:
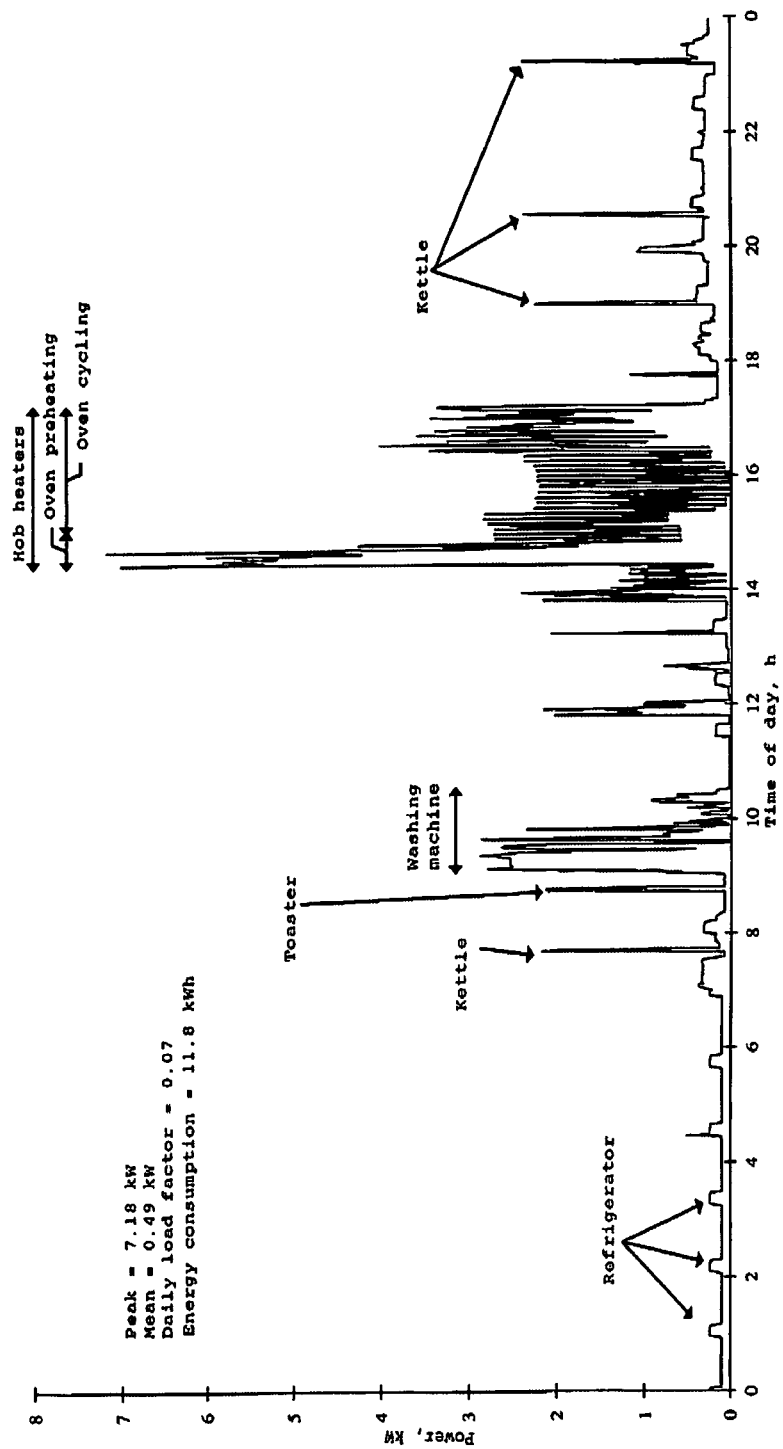

Smart meters can provide energy consumption measurements to energy suppliers (almost) instantaneously. This is quite beneficial for the smart grid because it allows an enhancement in the ability of monitoring, controlling and predicting energy use, amongst other advantages. However, some privacy issues may arise, since such monitoring could reveal final users presence in their houses, which electrical appliances they are using at each moment, or even their daily habits at home, as shown in FIG. 1. Therefore, the risk of smart grid deployment lies in the danger that customers become "transparent" customers, since the monitoring and (potentially malicious) analysis of individual consumption data allows for far-reaching conclusions about the customers' lifestyles.

It is to be noted that although the present description is mostly related to smart meters for monitoring electrical energy consumption, it is also possible to measure in a household the consumption of water, gas, heat or the like.

It is therefore an object of the present invention to improve and further develop a smart grid and a method for operating a smart grid of the initially described type in such a way that, by employing mechanisms that are readily to implement, privacy issues of end users/customers are preserved in a reliable and efficient way.

In accordance with the invention, the aforementioned object is accomplished by a method comprising the features of claim 1. According to this claim such a method is characterized in the following steps:

said smart grid is partitioned into groups G of smart meters $sm_i$, such that each of said smart meters belongs to exactly one group, all smart meters $sm_i$ of one of said groups encrypt their measured value $e_i$ by applying a bihomomorphic encryption scheme $E_{ki}$ and send it to said central entity ES, one smart meter per group is designated as key aggregator to which all smart meters $sm_i$ of that group send their key $k_i$ employed for said encryption, said key aggregator computes the aggregation of all received keys $k_i$ and sends the aggregated key K to said central entity ES, said central entity ES aggregates all received encrypted measured values $e_i$ and decrypts said aggregation by employing said aggregated key K.

Furthermore, the aforementioned object is accomplished by a smart grid comprising the features of claim 21. According to this claim such a smart grid is characterized in that said smart grid is partitioned into groups G of smart meters $sm_i$, such that each of said smart meters belongs to exactly one group, wherein all smart meters $sm_i$ of one of said groups are configured to encrypt their measured value $e_i$ by applying a bihomomorphic encryption scheme $E_{ki}$ to send it to said central entity ES, wherein one smart meter per group is designated as key aggregator to which all smart meters $sm_i$ of that group send their key $k_i$ employed for said encryption, wherein said key aggregator includes means for computing the aggregation of all received keys $k_i$ and for sending the aggregated key K to said central entity ES, and wherein said central entity ES is configured to aggregate all received encrypted measured values $e_i$ and to decrypt said aggregation by employing said aggregated key K.

According to the invention it has been recognized that bihomomorphic encryption/decryption of measurements of physical measuring variables, in particular energy consumption, can be employed to guarantee integrity and confidentiality of the measurement values. Insofar, the present invention provides a privacy enhanced architecture for smart metering in order to achieve protection of final users' privacy, e.g. with respect to their energy consumption habits. The present invention prevents the central entity to find out the individual smart meters measurements, but allows it to know the aggregation of them.

In other words, the central entity is provided with an aggregation of encrypted values (the individual smart meters reports). The central entity cannot decrypt such individual values (preserving this way users' privacy), but it can indeed decrypt the aggregation of them, by means of a bihomomorphic encryption. A bihomomorphic encryption scheme is a symmetric encryption scheme that is homomorphic both on the plaintext space and on the key space. Thus, while the privacy of individual users is preserved, the central entity, e.g. an electricity supplier, is able to accurately monitor the amount of energy (or water, gas, heat, etc., as the case may be) needed by its customers. While this is not necessary for the technical operation of the electricity network, the information can be used for trading with electrical energy. Even nowadays, each electricity supplier has to buy the amount of energy used by its customers at any specific point in time. However, this is currently based on an estimation (using the overall electricity consumption of those customers over a whole year and assuming certain load curves based on prior experience). In addition, aggregated up-to-date information about energy usage of certain groups may improve the forecasts about load of the electricity network in the near future. This information is useful for planning, e.g., which power plants to use.

In accordance with the invention the grouping of smart meters makes the issuer of a report and such report unlinkable to each other, thereby preserving their privacy from the central entity. Furthermore, the deployment of a key aggregator in a fashion as described above results in that, i) nobody knows other member keys (except the key aggregator), and ii) it does not matter if the aggregator acts maliciously and shares received keys with the central entity because the later cannot link or relate each key with each received measurement value from that group.

According to a preferred embodiment it may be provided that the at least one specific physical measured quantity is the electrical energy consumption of a consuming unit, in particular a household, an enterprise, a plant, or the like. In such case the central entity may be an energy supplier. In this context it is important to note that the electricity supplier is not necessarily identical to the electrical network provider (though, in some cases, it actually is).

With respect to a structured and natural arrangement of the groups of smart meters, it may be provided that groups of smart meters are configured by putting into the same group, for instance all the smart meters belonging to a specific building, street, neighborhood, village, or the like. In any case, it is to be noted that all the smart meters within the same group also belong to the same energy supplier. For instance, group $G_k$ would be composed by $$G_k = \{sm_1^k, sm_2^k, \ldots, sm_n^k\}.$$

With respect to keeping the central entity reliably up-to-date it may be provided that the smart meters report their measurements to the central entity in regular time intervals, which may be regarded as reporting periods.

Advantageously, in order to ensure secure data transmission it may be provided that the smart meters report their measurements to the central entity through a secure channel. The establishment of a secure channel requires the use of an authentication mechanism. In theory, any authentication mechanism could be used; the most suitable ones, in order to authenticate the smart meter only as a member of a group of authorized smart meters, would be group signatures or anonymous credential schemes. As a consequence, it is assured that the key aggregator cannot decrypt the values sent by each smart meter, even if he knows their keys, since the former are sent to the central entity through a secure channel.

With respect to further enhancing security, it may be provided that one smart meter per group is only periodically designated as the key aggregator, i.e. that the smart meter being designated as key aggregator within the group is changed from time to time. In particular, it may be provided that a change of the key aggregator is performed in case a smart meter being designated as key aggregator fails, leaves the group and/or is found to act maliciously. In any case it may be provided that the rest of member smart meters of a group send their keys to the key aggregator in a secure way.

Once the key aggregator has received all the group members' keys, it aggregates them in order to obtain the aggregated key K in the following way:

$$K = f(k_1, k_2, \ldots, k_n) = \bigoplus_{i=1}^{n} k_i = \sum_{i=1}^{n} k_i.$$

Then, it sends the aggregated key K to the central entity through a secure channel. In order to keep the signaling overhead as low as possible, it may be provided that the aggregated key K is sent to the central entity only once at the first time, i.e. in connection with a first period of measurement reports of a group of smart meters. Subsequently, the aggregated key K has to be sent to the central entity only every time one smart meter fails and/or leaves or enters/joins the respective group.

According to a preferred embodiment reporting periods are defined, wherein each smart meter of a group uses a different key per reporting period for encrypting its measurement value of that period. By changing the key of a smart meter every reporting period the security of the process is further enhanced since it becomes almost impossible for a malicious participant to decrypt the measured values. Advantageously, in order to enable effortless decryption on the part of the central entity, the keys being employed for each reporting period may be computed in such a way that the aggregation of all the keys of all smart meters of a group always remains the same, i.e. the aggregated key K remains constant. As a consequence, as already outlined above, the number of reporting messages of the aggregated key K from the key aggregator to the central entity can be minimized.

In a specific embodiment it may be provided that smart meters within the same group form a "ring", wherein each smart meter sends to the next one in the ring a random value $\delta$, through a secure channel, which is subtracted from its key and added to the next smart meter key as follows:

$$k_{i,j} = k_{i,j-1} - \delta_{i,j} + \delta_{i-1,j}.$$

In other words, each smart meter $sm_i$, for establishing a new key $k_{i,j}$ for a subsequent reporting period j, subtracts from its key $k_{i,j-1}$ employed in the preceding reporting period j−1 the random value $\delta_{i,j}$ sent to the next smart meter within the ring and adds the random value $\delta_{i-1,j}$ received from the preceding smart meter within the ring.

If a smart meter within a group fails, or acts faulty or even maliciously, and tries to subvert the system by sending its key to the key aggregator, but not the corresponding encrypted measurement value (or vice versa), then the central entity is not able to perform the correct decryption.

In order to tackle this issue and to prevent malicious/faulty smart meters, according to preferred embodiment an additional mechanism, referred to as "tokens solution" hereinafter, may be applied. This "tokens solution" may be realized as follows:

a) Each smart meter $sm_i$ sends its key $k_{ij}$ to the key aggregator KA through a secure channel b) The key aggregator KA, upon receiving a key from a smart meter, replies with an acknowledgement token (referred to as ACK token hereinafter), $T_{KA,i}$ c) Each smart meter $sm_i$ sends then the encrypted measurement $E_{k_{i,j}}(e_{ij})$, together with the ACK token $T_{KA,i}$, to the central entity d) The central entity only accepts encrypted measurements from smart meters that come with such tokens e) The central entity replies with another ACK token $T_{CE,i}$, directly to the key aggregator KA f) Once the key aggregator receives such token $Ta_{CE,i}$, it actually accepts the key $k_{ij}$ received in step a)

Step d) ensures that it is impossible to send an encrypted value without having previously sent the key to the key aggregator. In turn, step e) excludes the possibility that a smart meter could send its key to the key aggregator, without sending the encrypted measurement to the central entity.

Again, in order to keep the signaling overhead as low as possible the tokens solution outlined above may be enabled only for a period where a threat is detected such that the central entity is not able to decrypt the aggregation of encrypted values, coming back to the normal functioning scheme straight afterwards.

By applying the described bihomomorphic encryption/decryption of energy consumption measurements generated by smart meters, together with the constitution of smart meters groups, the explained keys updating mechanism and, when necessary, the "tokens solution", a system is achieved where a central entity, in particular an energy supplier, can still benefit from the (almost) instantaneous reports from smart meters in order to better monitor, control, and predict energy use, while preserving the privacy of final users in terms of their daily habits at home or their appliances usage patterns, for instance.

There are several ways how to design and further develop the teaching of the present invention in an advantageous way. To this end, it is to be referred to the patent claims subordinate to patent claim 1 on the one hand, and to the following explanation of a preferred example of an embodiment of the invention illustrated by the drawing on the other hand.

In connection with the explanation of the preferred example of an embodiment of the invention by the aid of the drawing, generally preferred embodiments and further developments of the teaching will be explained. In the drawings FIG. 1 is a diagram illustrating exemplarily a load profile of a single-person household measured and report by a smart meter according to prior art, FIG. 2 schematically illustrates an embodiment of a method according to the present invention with two different groups of smart meters, and FIG. 3 schematically illustrates a part of a smart grid in which a scenario of smart meter key updating is executed according to an embodiment of the present invention.

Figure 2:
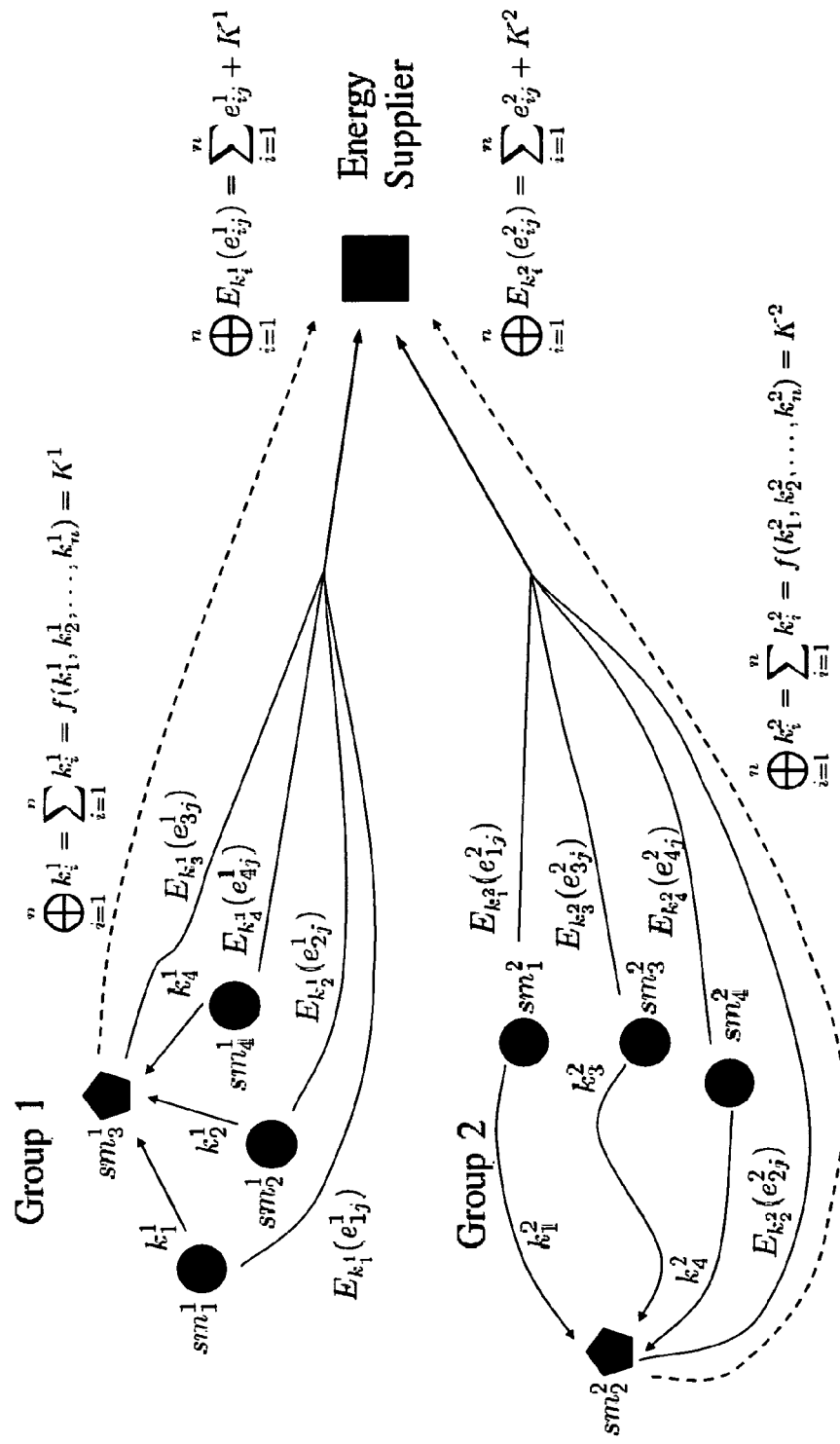
Figure 3:
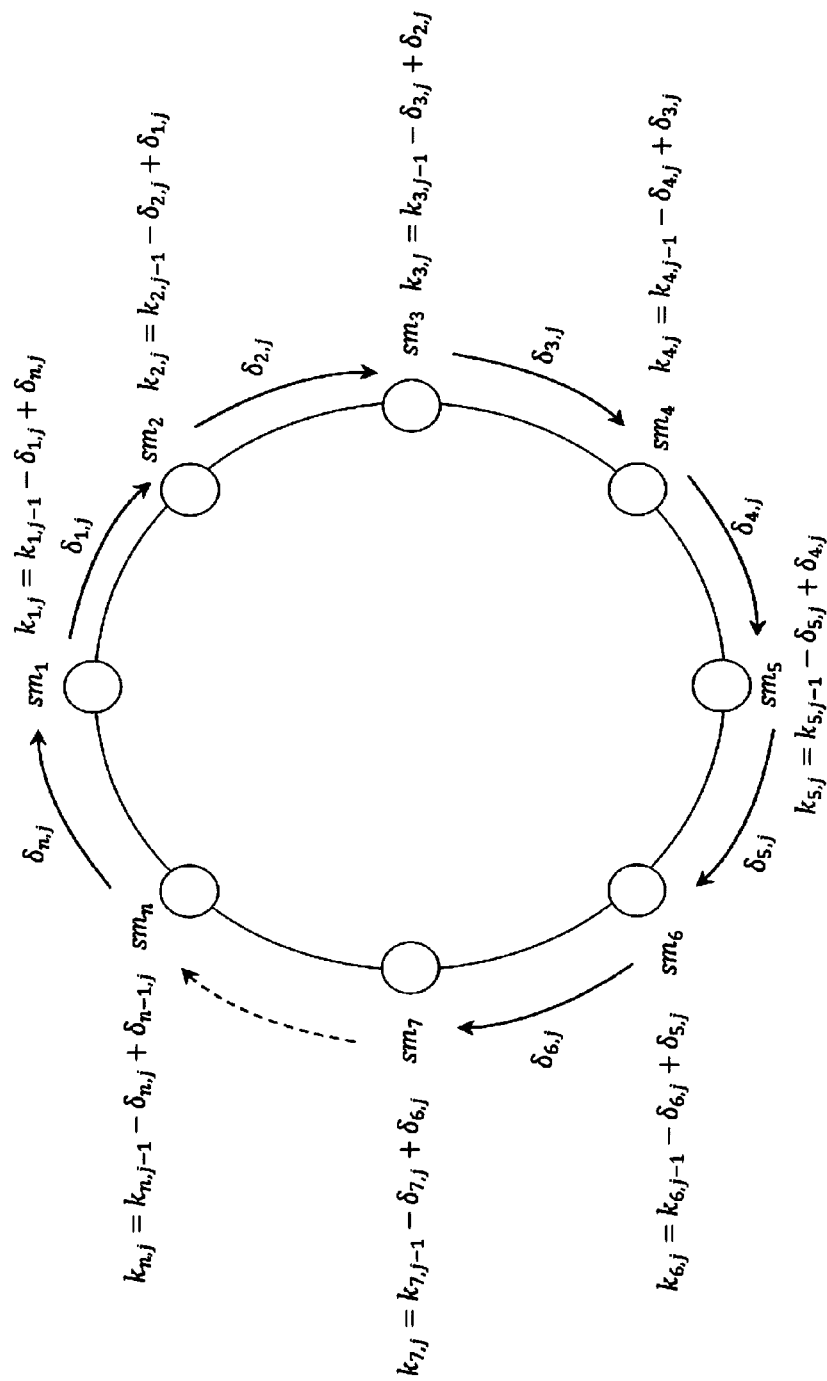

With reference to FIG. 2, an Energy Supplier (from now on, ES) is illustrated that receives electricity measurements $e_{ij}$ from a plurality of smart meters $sm_i$ in period j. In the scenario illustrated in FIG. 2 it is an objective to avoid the ES to know individual measurements from smart meters $sm_i$, but only the aggregation of the later. Additionally, it is an objective to avoid the figure of an intermediate aggregator. To do so, the ES must receive all the individual values encrypted, without being able to decrypt them. But, once the aggregation is done, it should be indeed able to decrypt such aggregated value.

In accordance with the present invention smart meters $sm_i$ are "hidden" within groups G, two of which are depicted in FIG. 1—Group 1 and Group 2. That is, every smart meter $sm_i$ takes its measured value $e_{ij}$, encrypts it by using key $k_{ij}$ and applying encryption scheme E, and sends the encrypted value $E_{kij}(e_{ij})$ to the ES, through a secure channel, thereby hiding its real identity as "a member of group G(i)", wherein $$E_{k_{ij}}(e_{ij}) = e_{ij} + k_{ij}.$$

In accordance with the present invention a bihomomorphic encryption scheme E is employed, which is a symmetric encryption scheme that is additive homomorphic both on the plaintext space and on the key space. This type of encryption allows the ES to decrypt the aggregation of encrypted reports, but not those encrypted measurements individually. The key aggregator only knows the individual keys, while the ES only knows both the aggregated key K and the individual encrypted measurements. It is to be noted that any secure additive bihomomorphic encryption mechanism with these features can be used in the context of the present invention.

In summary, in the embodiment of FIG. 2 the following steps are executed, which in the following are described for Group 1:

1) Each smart meter of Group 1 $sm_i^1$, at time j, updates its key $k_{ij}^1$ and sends it to the key aggregator. In the scenario of FIG. 2, smart meter $sm_3^1$ is currently designated as key aggregator, as indicated by the pentagonal shape of the smart meter.

2) The key aggregator computes the aggregation of all received keys according to the following equation:

$$K = f(k_1, k_2, \ldots, k_n) = \bigoplus_{i=1}^{n} k_i = \sum_{i=1}^{n} k_i,$$

and sends such aggregated key K to the ES, as illustrated by the dashed line. This step is performed only once at the beginning or every time a smart meter of the group leaves/fails or enters/joins the group. If it's not the beginning, then the key aggregator checks that the aggregation of received keys $k_{ij}^1$ is equal to the aggregated i key K, for consistency.

3) Each smart meter $sm_i^1$ encrypts its consumption measurement at time j, $e_{ij}$, using its key $k_{ij}^1$, giving as a result $E_{k_{ij}}(e_{ij}^1)$.

4) The ES receives the encrypted measurements $E_{k_{ij}}(e_{ij}^1)$ ∀i, i.e.

$$(E_{k_{1j}}(e_{1j}^1), E_{k_{2j}}(e_{2j}^1), E_{k_{3j}}(e_{3j}^1), E_{k_{4j}}(e_{4j}^1)).$$

5) The ES computes the aggregation $$\bigoplus_{i=1}^{n} E_{k_{ij}}(e_{ij}^1)$$

that should be equal to $$E_K(\bigoplus_i e_{ij}^1)$$

through the following bihomomorphism:

$$\bigoplus_{i=1}^{n} E_{k_{ij}}(e_{ij}^1) =$$

$$\sum_{i=1}^{n} E_{k_{ij}}(e_{ij}^1) = \sum_{i=1}^{n} (e_{ij}^1 + k_{ij}^1) = \sum_{i=1}^{n} e_{ij}^1 + \sum_{i=1}^{n} k_{ij}^1 = \sum_{i=1}^{n} e_{ij}^1 + K = E_K\left(\bigoplus_{i=1}^{n} e_{ij}^1\right)$$

6) Then, the ES is able to decrypt such aggregation by means of the following expression:

$$D_K\left(\bigoplus_{i=1}^{n} E_{k_{ij}}(e_{ij}^1)\right) = D_K\left(E_K\left(\bigoplus_{i=1}^{n} e_{ij}^1\right)\right) =$$

$$D_K\left(\sum_{i=1}^{n} e_{ij}^1 + K\right) = \left(\sum_{i=1}^{n} e_{ij}^1 + K\right) - K = \sum_{i=1}^{n} e_{ij}^1 = \bigoplus_{i=1}^{n} e_{ij}^1$$

A bihomomorphic encryption is an encryption which is additive homomorphic both on the plaintext space and on the key space:

$$E_{k_1}(V_1) \oplus \ldots \oplus E_{k_\alpha}(V_\alpha) = E_{k_1 \circledS \ldots \circledS k_\alpha}(V_1 + \ldots + V_\alpha).$$

As mentioned before, this type of encryption allows the ES to decrypt the aggregation of encrypted reports, but not those encrypted measurements individually. The key aggregator only knows the individual keys, while the ES only knows both the aggregated key K and the individual encrypted measurements.

In the unlikely case of having a collusion between the current (malicious) key aggregator and the ES, the former could send the individual keys of the smart meters of its group to the later, instead of sending the aggregation of such keys. Then, the ES could try all the possible combinations between the set of keys and the set of individual encrypted values, trying to decrypt the later. However, since the individual keys are updated every round, and the key aggregator is designated periodically, it would be computationally expensive (and probably not worthy) for the ES to collude with the key aggregator and perform such attack.

FIG. 3 schematically illustrates an updating process for the keys employed by smart meters of a specific group according to an embodiment of the present invention. The key updating is performed per reporting period in such a way that the aggregation of all the keys of the group, i.e. the aggregated key K, always remains constant. To this end, smart meters within the same group form a "ring" where each smart meter sends to the next one in the ring a random value, through a secure channel, which is subtracted from its key and added to the next smart meter's key as follows:

$$k_{i,j} = k_{i,j-1} - \delta_{i,j} + \delta_{i-1,j},$$

wherein j denotes a current reporting period and j−1 the previous reporting period.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Method for operating a smart grid including a plurality of smart meters, said smart meters being configured to monitor at least one physical measured quantity and to provide measurement results of said at least one physical measured quantity to a central entity, comprising the steps of:
said smart grid being partitioned into groups G of smart meters $sm_i$, such that each of said smart meters belongs to exactly one group,
all smart meters $sm_i$ of one of said groups G encrypting their measured value $e_i$ by applying a bihomomorphic encryption scheme $E_{ki}$ and send it to said central entity,
one smart meter per group being designated as key aggregator to which all smart meters $sm_i$ of that group send their key $k_i$ employed for said encryption,
said key aggregator computing the aggregation of all received keys $k_i$ and sends the aggregated key K to said central entity,
said central entity aggregating all received encrypted measured values $e_i$ and decrypts said aggregation by employing said aggregated key K,
wherein reporting periods j are defined and wherein each smart meter $sm_i$ uses a different key $k_{i,j}$ per reporting period for encrypting said at least one specific physical measured quantity,
wherein smart meters $sm_i$ of the same group G are composed as a ring,
wherein each smart meter sends to the subsequent smart meter in said ring a random value $\delta_{i,j}$, and
wherein each smart meter $sm_i$, for establishing a new key $k_{i,j}$ for a subsequent reporting period j, subtracts from its key $k_{i,j-1}$ employed in the preceding reporting period j−1 the random value $\delta_{i,j}$ sent to the next smart meter in said ring and adds the random value $\delta_{i-1,j}$ received from the preceding smart meter in said ring.

2. Method according to claim 1, wherein said at least one specific physical measured quantity is the electrical energy consumption of a consuming unit, in particular a household.

3. Method according to claim 1, wherein said central entity is an energy supplier.

4. Method according to claim 1, wherein said groups G of smart meters $sm_i$ are configured by putting into the same group smart meters $sm_i$ belonging to a specific building, street, or village.

5. Method according to claim 1, wherein said smart meters $sm_i$ report said at least one specific physical measured quantity to said central entity in regular time intervals.

6. Method according to claim 1, wherein said smart meters $sm_i$ report said at least one specific physical measured quantity to said central entity through a secure channel.

7. Method according to claim 6, wherein group signatures are employed for establishing said secure channel.

8. Method according to claim 1, wherein the smart meter $sm_i$ being designated as key aggregator within a group G is changed from time to time.

9. Method according to claim 1, wherein a change of said key aggregator is performed in case a smart meter $sm_i$ being designated as key aggregator fails, leaves the group G and/or acts maliciously.

10. Method according to claim 1, wherein said key aggregator sends the aggregated key K to said central entity through a secure channel.

11. Method according to claim 1, wherein said key aggregator sends the aggregated key K to said central entity each time a smart meter $sm_i$ of the respective group G fails or leaves or enters said group.

12. Method according to claim 1, wherein said keys $k_{i,j}$ for each reporting period j are computed in such a way that the aggregated key K of all smart meters $sm_i$ of a group G remains the same.

13. Method for operating a smart grid including a plurality of smart meters, said smart meters being configured to monitor at least one physical measured quantity and to provide measurement results of said at least one physical measured quantity to a central entity, comprising the steps of:
said smart grid being partitioned into groups G of smart meters $sm_i$, such that each of said smart meters belongs to exactly one group,
all smart meters $sm_i$ of one of said groups G encrypting their measured value $e_i$ by applying a bihomomorphic encryption scheme $E_{ki}$ and send it to said central entity,
one smart meter per group being designated as key aggregator to which all smart meters $sm_i$ of that group send their key $k_i$ employed for said encryption,
said key aggregator computing the aggregation of all received keys $k_i$ and sends the aggregated key K to said central entity,
said central entity aggregating all received encrypted measured values $e_i$ and decrypts said aggregation by employing said aggregated key K,
wherein said key aggregator, upon receiving a key from a smart meter $sm_i$, replies with an acknowledgement token, and
wherein said smart meter $sm_i$ includes said acknowledgement token into its report of said at least one specific physical measured quantity to said central entity.

14. Method according to claim 13, wherein said central entity is configured to refuse measurement report from smart meters $sm_i$ that do not include said token.

15. Method according to claim 13, wherein said central entity, upon receiving a measurement report from a smart meter $sm_i$ including a token, replies to said key aggregator with another token.

16. Method according to claim 15, wherein said key aggregator, upon receiving said token from said central entity, accepts said key received from the corresponding smart meter $sm_i$.

17. Method for operating a smart grid including a plurality of smart meters, said smart meters being configured to monitor at least one physical measured quantity and to provide measurement results of said at least one physical measured quantity to a central entity, comprising the steps of:

said smart grid being partitioned into groups G of smart meters $sm_i$, such that each of said smart meters belongs to exactly one group, all smart meters $sm_i$ of one of said groups G encrypting their measured value $e_i$ by applying a bihomomorphic encryption scheme $E_{ki}$ and send it to said central entity, one smart meter per group being designated as key aggregator to which all smart meters $sm_i$ of that group send their key $k_i$ employed for said encryption, said key aggregator computing the aggregation of all received keys $k_i$ and sends the aggregated key K to said central entity, said central entity aggregating all received encrypted measured values $e_i$ and decrypts said aggregation by employing said aggregated key K, wherein said key aggregator, upon receiving a key from a smart meter $sm_i$, replies with an acknowledgement token, and wherein said tokens are added to the respective messages only in cases where said central entity is not able to decrypt the aggregated encrypted measured values $e_i$.

* * * * *